(No Model.)

A. F. MUNRO & G. O. HITCHINGS.
PNEUMATIC TIRE.

No. 566,603. Patented Aug. 25, 1896.

WITNESSES
INVENTORS
Alexander F. Munro
George O. Hitchings
By Edwin W. Brown
Attorney

UNITED STATES PATENT OFFICE.

ALEXANDER F. MUNRO, OF BOSTON, AND GEORGE O. HITCHINGS, OF SAUGUS, MASSACHUSETTS, ASSIGNORS, BY DIRECT AND MESNE ASSIGNMENTS, TO THE M. & H. MANUFACTURING COMPANY, OF MAINE.

PNEUMATIC TIRE.

SPECIFICATION forming part of Letters Patent No. 566,603, dated August 25, 1896.

Application filed December 27, 1895. Serial No. 573,423. (No model.)

*To all whom it may concern:*

Be it known that we, ALEXANDER F. MUNRO, of Boston, in the county of Suffolk, and GEORGE O. HITCHINGS, of Saugus, in the county of Essex, State of Massachusetts, have invented certain new and useful Improvements in Pneumatic Tires for Bicycle and other Wheels, of which the following is a full, clear, and exact description.

Figure 1:
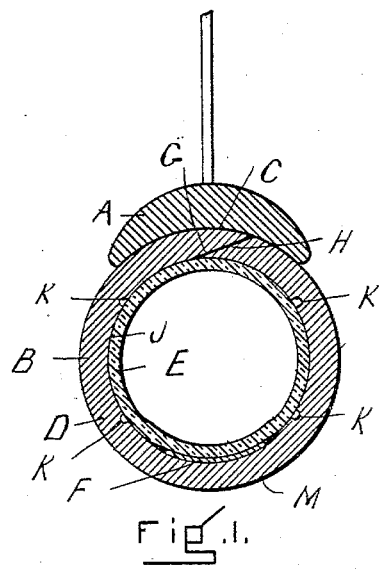
Figure 2:
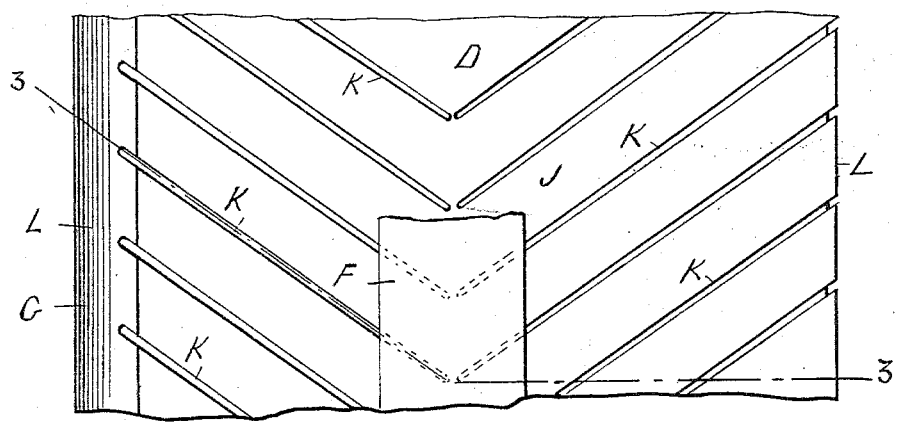
Figure 3:
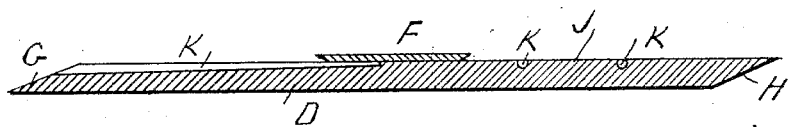

This invention consists of a pneumatic tire for bicycle and other wheels constructed and arranged substantially as hereinafter fully described, reference being had to the accompanying sheet of drawings, in which is illustrated a pneumatic tire constructed in accordance with this invention, Figure 1 being a detail cross-section of the rim of a bicycle-wheel having this improved tire applied thereto. Fig. 2 is a detail plan view of a strip of leather prepared for shaping it into a form for the tire. Fig. 3 is a cross-section on line 3 3, Fig. 2.

In the drawings, A represents in cross-section the rim of a wheel of a bicycle, and B the pneumatic tire, the rim being suitably hollowed out circumferentially at C to receive the pneumatic tire, as usual, and needing no more particular description herein. This tire is of tube form, and it is constructed of leather D and an inner lining tube E, of india-rubber, with a strip of thin leather or skin F located, as shown, on the inner side of the leather D between it and the india-rubber lining over the portion of the tire which runs upon the ground when in use. The leather is cut into strips of the required length to encircle, circumferentially, the rim of the wheel and of a width for the desired diameter of the tire. At its side edges it is skived or chamfered on opposite sides, as at G and H, respectively.

Across the surface or side J of the leather strip which is intended for the inside of the pneumatic tube are cut a series of grooves or serrations K at intervals desired, extending from each side edge L in diagonal lines parallel or substantially parallel with each other, to or nearly to the central longitudinal line of the strip, as shown in Fig. 2. These grooves or serrations are preferably wider and deeper at the edges of the strip and gradually narrowing and lessening in depth, respectively, toward the central line of the strip.

Over the central longitudinal portion of the inner side J of the leather strip is secured, by paste or cement or in any suitable manner, a thin strip or skiver F of leather, which extends the length of the strip and is of a width to correspond substantially to the width of the bearing-surface M of the tire when in use.

The india-rubber is preferably made in the form of a tube or pipe, although it can be in strip form and folded if desired.

In putting the parts together to form the tire the leather strip, having its edges chamfered and the thin strip M applied thereto, is folded or rolled closely over the india-rubber tube and its chamfered sides or edges overlapped and secured together by cement or in any suitable manner. The tire is then pressed round and closely to the seat in the groove C of the wheel-rim, its joint inside, as shown in cross-section in Fig. 1. The ends are secured together in any of the usual ways of securing pneumatic tires of rubber or other flexible material to make the tire practically endless and air-tight.

The grooves and serrations increase the flexibility of the leather. At the same time they are not deep or wide enough to detract much from its requisite strength.

The ends of the tire are joined and secured together in any of the usual ways to make the joint on its outer surface flush and smooth and needing no particular description herein.

The tire can be made without the india-rubber lining, but it is preferable to have it.

The strip M, secured to the leather, serves to strengthen that portion of the tire where the most strain and wear and tear come in use.

Having thus described our invention, what we claim is—

1. A pneumatic tire for bicycle and other wheels made of leather, its inner surface having grooves or serrations, in diagonal lines and a lining of india-rubber.

2. A pneumatic tire for bicycle and other wheels made of leather its inner surface having grooves or serrations running in diagonal lines from the longitudinal central line of tread of the tire.

3. A pneumatic tire for bicycle and other wheels made of leather, its inner surface having grooves or serrations running in diagonal lines from the longitudinal central line of tread of the tire, and a lining of india-rubber.

4. A pneumatic tire for bicycle and other wheels made of leather, its inner surface having grooves or serrations, and a strip of leather secured to the inner side of the tire along its line of tread.

5. A pneumatic tire for bicycle and other wheels made of leather, its inner surface having grooves or serrations, a strip of leather secured to the inner side of the tire along its line of tread, and a lining of india-rubber.

6. A pneumatic tire for bicycle and other wheels of leather, the inner surface of the leather being grooved or serrated, the grooves or serrations tapering in width from their ends at the center line of the tread of the tire to their outer or other ends, and an inner lining of india-rubber.

In testimony whereof we have hereunto set our hands in the presence of two subscribing witnesses.

ALEXANDER F. MUNRO.
    GEORGE O. HITCHINGS.

Witnesses:
    EDWIN W. BROWN,
    LEONA C. AMO.